May 5, 1953
R. S. HINSEY
2,637,218
MECHANISM CONTROL
Filed Dec. 16, 1949
2 SHEETS—SHEET 1
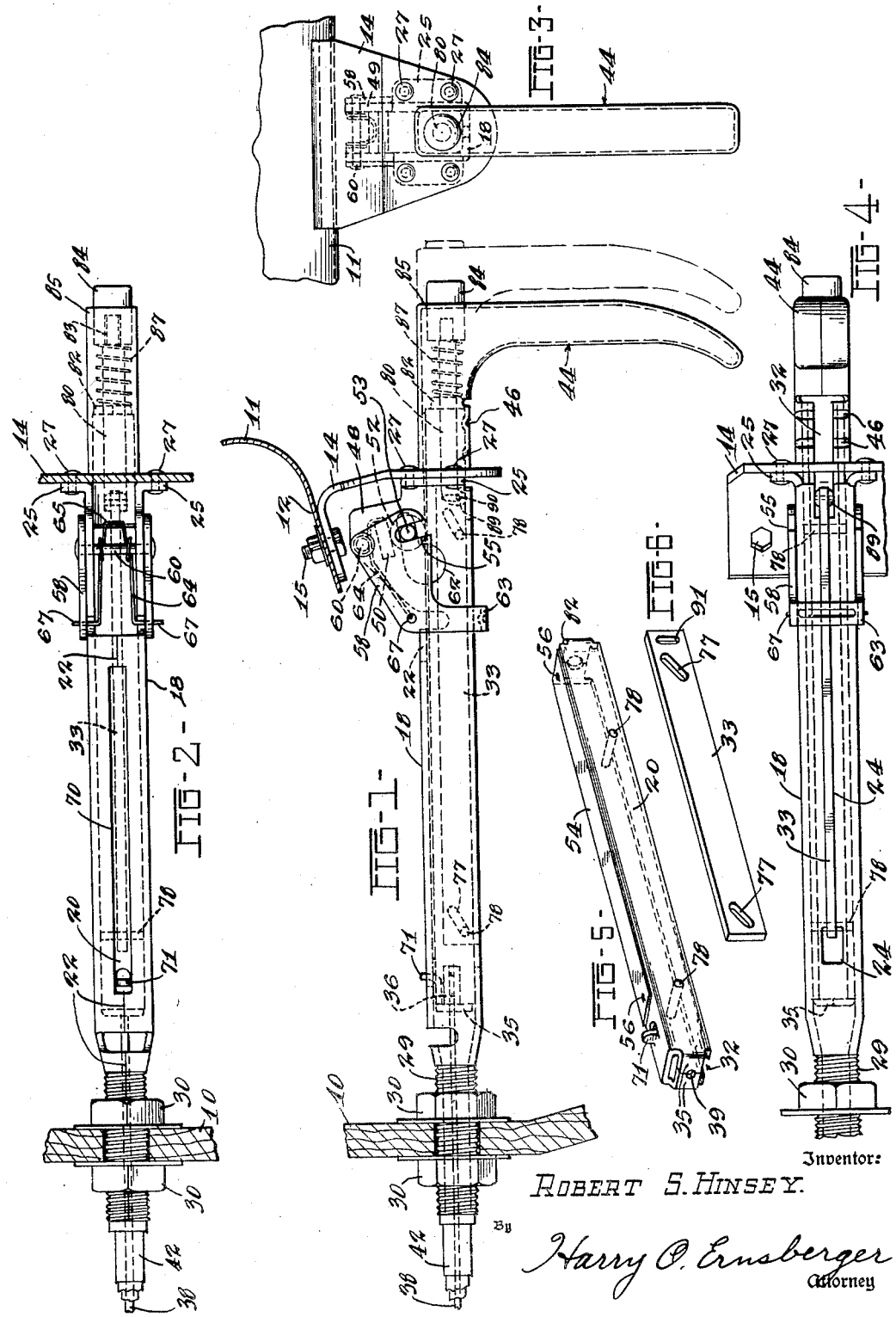
Inventor:
ROBERT S. HINSEY.
By
Harry O. Ernsberger
Attorney May 5, 1953
R. S. HINSEY
2,637,218
MECHANISM CONTROL
Filed Dec. 16, 1949
2 SHEETS—SHEET 2
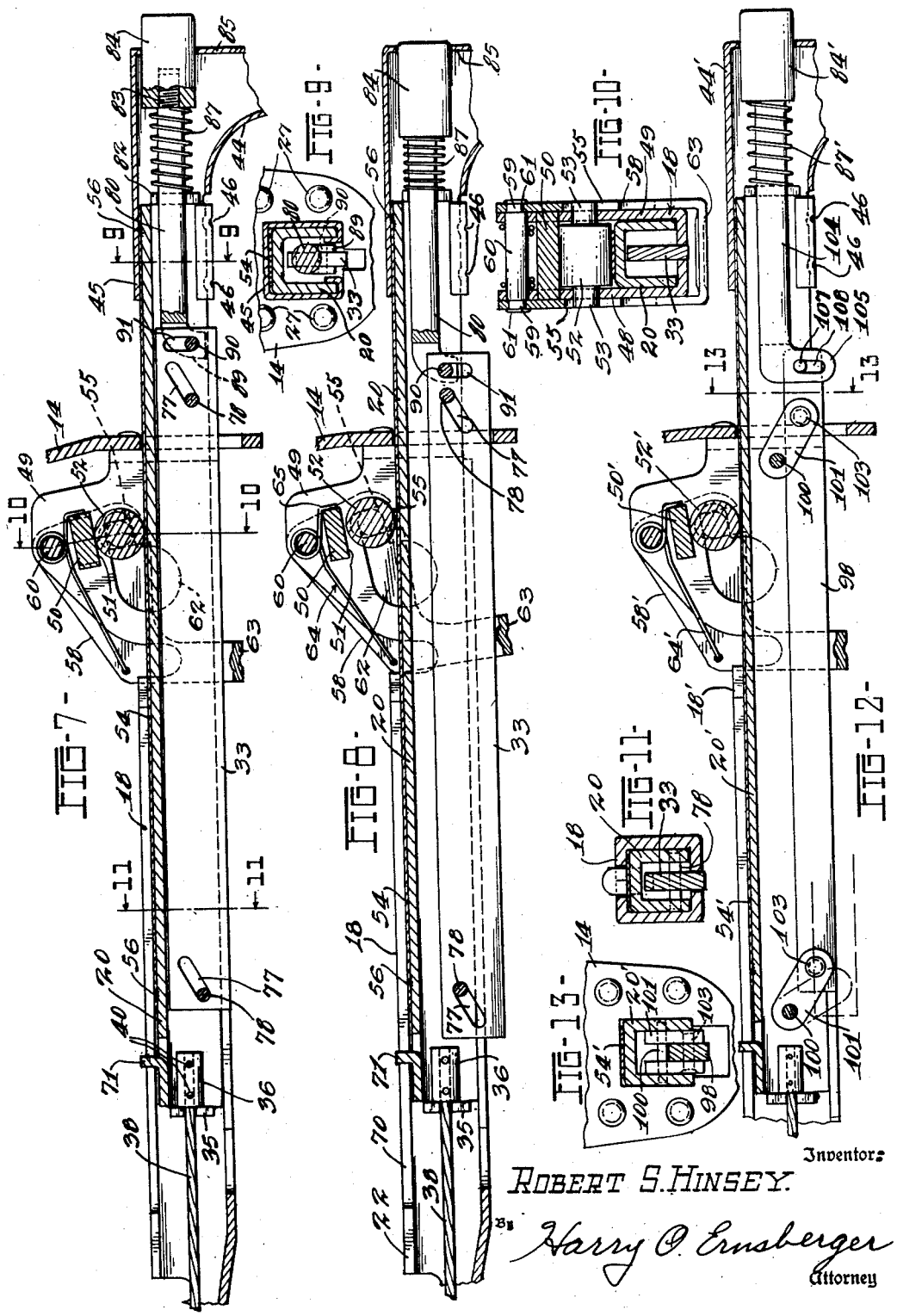
Inventor:
ROBERT S. HINSEY.
By Harry O. Ernsberger
Attorney Patented May 5, 1953

2,637,218

UNITED STATES PATENT OFFICE 2,637,218

MECHANISM CONTROL

Robert S. Hinsey, Toledo, Ohio, assignor to The Bingham-Herbrand Corporation, Toledo, Ohio, a corporation of Ohio Application December 16, 1949, Serial No. 133,439

15 Claims. (Cl. 74—503)

This invention relates to mechanism actuating or control devices and more particularly to an arrangement especially adapted for actuating and controlling the emergency or parking brakes of an automotive vehicle.

The invention embraces the provision of longitudinally actuable or movable means cooperating with a friction lock arrangement for retaining the longitudinally movable or actuable means in adjusted position.

The invention has for an object the provision of mechanism actuating means embodying a longitudinally movable bar or member adapted to be connected to mechanism to be actuated in conjunction with a friction lock means for retaining the longitudinally movable bar in any position of longitudinal adjustment, the combination including means in the form of an independently operable member for effecting a release of the lock means to permit retrograde movement of the longitudinally movable member to its initial position.

Another object of the invention is the provision of mechanism actuating means embodying a pull bar operating in conjunction with a friction roller lock means for holding the pull bar in any position of longitudinal adjustment, the arrangement embodying a member carried by the pull bar and movable laterally with respect thereto for releasing the roller from engagement with the bar through independent movement of the member carried by the bar.

A further object of the invention resides in the provision of a pull type brake actuating device for a vehicle embodying a longitudinally movable member fashioned of sheet metal adapted for cooperation with a friction lock or brake means for holding the longitudinally movable member in adjusted position, the member being provided with a hardened plate or element adapted to be engaged directly by the lock means, this arrangement providing for long life with a minimum of wear of the locking mechanism.

Another object of the invention is the provision of a pull type brake actuating device for vehicles, the device including a longitudinally movable pull bar and a friction roller lock means cooperating with the pull bar for retaining the latter in any position of longitudinal adjustment, the device including a manually operable element independently movable with respect to the pull bar for effecting a release of the lock means, the lock means being so arranged that relatively slight additional advance movement of the pull bar is required to effect a release of the lock means through independent movement of the lock releasing element.

Still a further object of the invention is the provision of a pull type brake actuating device in which the brake actuating member is provided with a wear plate or element fashioned of hardened spring steel or the like cooperable with a friction lock means, the arrangement facilitating the manufacture of the member from sheet metal at a low cost through the elimination of hardening and heat treating the member.

Still another object of the invention is the provision of a pull type brake actuating device in which the major elements are fashioned or fabricated from sheet metal so as to facilitate interchangeability of parts and wherein the parts may be inexpensively produced in mass quantities.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view illustrating a form of the invention as utilized for actuating the parking or emergency brakes of a vehicle, the mechanism being illustrated as supported by the instrument panel and dashboard of a vehicle;

Figure 2 is a top plan view of the arrangement illustrated in Figure 1;

Figure 3 is an end view of the mechanism illustrated in Figure 1;

Figure 4 is a bottom plan view of the mechanism illustrated in Figure 1;

Figure 5 is an isometric view illustrating the pull bar construction of my invention;

Figure 6 is an isometric view illustrating an element forming a part of the lock releasing mechanism;

Figure 7 is a longitudinal sectional view showing the locking mechanism in effective position retaining the pull bar in adjusted position;

Figure 8 is a view similar to Figure 7 showing the lock and lock releasing means in lock released position;

Figure 9 is a vertical sectional view taken substantially on the line 9—9 of Figure 7;

Figure 10 is a vertical sectional view taken substantially on the line 10—10 of Figure 7;

Figure 11 is a detail vertical sectional view taken substantially on the line 11—11 of Figure 7;

Figure 12 is a longitudinal sectional view similar to Figure 7 illustrating a modified form of the invention;

Figure 13 is a detail sectional view taken substantially on the line 13—13 of Figure 12.

While I have illustrated the forms of the invention of mechanism control as particularly adaptable for actuating the emergency or parking brakes of a vehicle, it is to be understood that the arrangement of the invention may be used for actuating or controlling other mechanisms.

Referring to the drawings in detail and first with respect to Figure 1, the dashboard of a vehicle is indicated at 10 and the instrument panel at 11. The arrangement of the invention is preferably supported by the instrument panel and the dashboard although other suitable supporting arrangements may be employed if desired. As illustrated in Figure 1 the instrument panel is provided with a forwardly extending flange 12, to which a bracket 14 is secured by means of bolts 15. An elongated hollow or tubular housing 18 preferably formed of sheet metal is adapted to directly support and function as a guide means for a longitudinally movable member or pull bar 20, the latter being adapted to be connected to the brake mechanism or other arrangement to be controlled. As particularly shown in the sectional view at Figure 11 the housing or guide member 18 is formed of sheet metal to substantially rectangular configuration, the metal being folded so that the free ends or edges thereof are in juxtaposed relation as indicated at 22 in Figure 2. The bottom wall of the housing 18 is formed with a longitudinally extending opening or slot 24. The righthand end of the housing 18 as viewed in Figures 1, 2 and 4 is integrally formed with laterally extending projections 25, which are secured to a depending portion of the bracket 14 by means of rivets 27. The other end portion of the tubular housing 18 is formed to cylindrical cross section and the exterior thereof threaded as at 29. The threaded cylindrical portion projects through an opening in the dashboard 10, a securing nut 30 being disposed at each side of the dashboard to retain the housing in relatively fixed position.

The brake actuating member or bar 20 is also formed of sheet metal to rectangular configuration in cross section and of a dimension to fit the interior of the housing 18 with sufficient clearance to be readily slidable therein. The bar 20 is fashioned so that the edges are spaced throughout a portion of their length as shown in Figure 5 providing a longitudinally extending space 32 to accommodate a bar or element 33 forming part of a lock releasing mechanism. The side wall portions of the member 20 at one end are formed with extensions 35 which are bent inwardly or laterally to the position illustrated in Figure 5, the portions 35 forming abutment means for a collar 36, the latter being securely fastened to the extremity of a flexible wire cable 38 which is connected to the brake mechanism (not shown) or other mechanism to be controlled. The adjacent edges of the inwardly turned ears 35 are notched as at 39 to accommodate the cable 38. The collar or stop member 36 may be securely fastened to the cable 38 by swaging or indenting portions of the collar as at 40 to drive or force projections formed thereby into securing engagement with the cable. The cable 38 is preferably contained within and guided by a suitable flexible sheath 42. It will be apparent that a longitudinal movement of the member 20 in a righthand direction as viewed in Figure 7 moves the cable 38 in a righthand direction for energizing the parking brakes of a vehicle or for controlling other mechanism connected thereto. The other end of member 20 extends through an opening in the bracket 14 and is provided with a handle or grip portion 44 also formed of sheet metal which is provided with a tubular portion 45 of a cross sectional contour to snugly fit over a portion of member 20. The portion 45 of the handle may be secured to the pull bar by indenting portions 46 of the handle extension or by spot welding or other suitable securing means.

Lock means is provided for frictionally retaining the bar 20 in any adjusted position relative to the stationary tube or housing 18. As particularly shown in Figures 7, 8 and 10, the parallel side wall portions 48 and 49 of the housing 18 project upwardly and are provided with rectangularly shaped openings adapted to accommodate an abutment or relatively stationary element 50, one surface 51 of which is adapted to be engaged by a lock member or roller 52. Mounted upon the upper surface of the bar 20 is a hardened plate element 54 presenting a smooth hard wear surface for engagement with the lock roller 52. The element 54 may be fashioned from a comparatively thin band of spring steel or the like which is disposed in contiguous relation with the upper surface of the bar 20, the ends of which are secured to the bar by spot welding as indicated at 56. By this means an inexpensively constructed hardened wear surface is provided for the bar or manipulating member 20 without hardening or heat treating the bar 20. This arrangement also eliminates any distortion of the bar 20 as the bar may be completely processed to finished form without subjecting it to any treatment which would cause distortion. It should be noted that the locking member engaging surface 51 of the abutment 50 is disposed at an acute or wedge angle with respect to the plane of the wear surface of plate 54 so as to cause the locking roller or member 52 to frictionally hold the bar or member 20 in adjusted position.

Means are provided for normally urging the locking member or roller 52 toward locking position and for effecting disengagement of the roller with the surface on members 50 and 54. Straddling the housing 18 and bar 20 is a U-shaped member or bracket 58, the upper portions of the legs of the bracket being provided with aligned openings to receive tenons 59 formed on a pin or stub shaft 60, the ends of the tenons being swaged as at 61 to secure the bracket 58 in assembled relation therewith. The pin or shaft 60 extends through aligned openings in the walls 48 and 49, the arrangement providing for pivotal movement of the bracket 58 about the axis of the shaft 60. The walls 48 and 49 are provided with openings 62 to accommodate the assembly of the locking roller or member 52 in the position shown in Figure 10. The locking roller or member 52 is provided with axially extending tenons 53 which project into slots 55 formed in the legs of the bracket 58. The walls of the slots 55 are in substantially parallel relation and snugly fit the tenons 53 and are arranged substantially at right angles to the plane of the surface 51 of the abutment 50 as shown in Figures 7 and 8. It will be noted that when the bracket 58 is swung in a counter-clockwise direction about the axis of the shaft 60 one wall of each of the slots 55 engages the tenons 53 and moves the roller 52 out of locking engagement with the member 54 and the surface 51 of the abutment member 50. A spring 64 surrounds the shaft 60 as shown in Figure 2, the bight portion 65 of the spring engaging the abutment block 50, the leg portions of the spring being formed with laterally extending projections 67 engaging in openings in the walls of bracket 58. The spring is biased in a direction to urge the bracket 58 toward rotation in a clockwise direction about the axis of the shaft 60 to resiliently bias the lock or roller 52 toward wedging or locking engagement with the block 50 and the hardened band or plate 54. The normal position of the roller 52 in clutching engagement with the bar 20 is illustrated in Figures 1 and 7 and is adapted to retain the bar 20 in any position of longitudinal adjustment.

The housing or tubular member 18 is formed with a longitudinal slot 70 to accommodate a projection or lug 71 which extends upwardly from the bar 20 into the slot 70, the portions of the housing bounding the ends of the slot forming abutments for preventing disassembly of the bar 20 with respect to the housing.

The arrangement of the invention is inclusive of means for effecting a release of the locking means in any position of adjustment of the member 20. As particularly shown in Figures 7 and 8 a locking roller releasing bar is coextensively disposed with the member 20 and within the hollow interior thereof. The bar 33 is formed with slots 77 arranged in parallelism and angularly disposed with respect to the longitudinal axis of the bar, each slot accommodating a pin 78 which is snugly fitted into openings formed in the side walls of the pull bar or member 20 as illustrated in Figure 11. When the bar 33 is in fully retracted position in the hollow interior of the member 20, the pins 78 are adjacent the lower ends of the slots as shown in Figure 7. Means is provided for actuating the releasing bar 33 whereby the bar may be moved transversely relative to the member 20 to bring the bar into engagement with the bight portion 63 of the bracket 58 so as to effect a release of the member or roller 52. Disposed longitudinally of the pull bar or member 20 is an actuating rod 80 which extends through an opening formed in end wall portions 82 of the member 20. The actuating rod 80 is formed with a tenon 83 upon which is threaded a cylindrical member 84 forming a push button or finger actuated member for manipulating the rod 80. The cylindrical member 84 extends through a suitable opening in the end wall 85 of the handle 44, the adjacent edge wall of the opening and the wall of the opening in the abutment 82 serving to guide the rod 80 during longitudinal movement thereof. An expansive coil spring 87 surrounds the rod 80 and is disposed between the wall portion 82 and the cylindrical member 84 and serves to bias the rod 80, push button 84 and releasing bar 33 to the relative positions illustrated in Figure 7. The inner end portion of the rod 80 is bent downwardly as at 89 and is slotted in a manner whereby the furcations straddle the bar 33. The furcations are provided with openings to accommodate a pin 90 which extends through a vertically arranged slot 91 in an end portion of the lock releasing bar 33. The vertical disposition of the slot 91 is to accommodate a compound longitudinal and vertical movement of the releasing bar 33 through the actuation of the rod 80. Thus when the parts are in the position illustrated in Figure 7, the bar 33 is out of engagement with the bight portion 63 of the releasing bracket 58.

Upon manual depression or inward movement of the push button 84 concomitantly with a further slight movement of the pull bar 20 toward brake setting position, the rod 80 is moved in a lefthand direction as viewed in Figure 8, the pin 90 exerting a longitudinally directed pressure on the lefthand wall of the slot 91 causing the bar 33 to move in an angular direction downwardly under the influence of the slots 77 whereby the lower edge of the bar 33 is brought into engagement with the bight portion 63 causing the bracket 58 to rotate in a counter-clockwise direction as viewed in Figure 8 about the axis of pin 60 to release the locking roller 52. As the locking roller 52 moves out of engagement with the hardened wear plate 54, the pull bar 20 may be retracted to brake releasing position. When the brakes are moved to "set" position, that is, when the member or bar 20 is extended in a righthand direction as viewed in Figures 7 and 8 the springs (not shown) for effecting the release of the brake mechanism exert a force on the cable 38 and the pull bar 20 urging the latter toward retracted position. This force augments the force of the spring 64 so that the roller 52 is tightly wedged between the wear plate 54 and the surface 51 of the abutment block or stationary clutch or locking member 50. In fact the wedging engagement is of such a high frictional character that it is quite difficult to actuate the bracket 58 simply by manual pressure against the push button 84. I have found however that when the brakes are in a "set" position and it is desired to release the brakes, a further slight movement of the handle 44 and bar 20 in a righthand direction causes a slight easing of wedging pressure of the locking roller so that the push button or member 84 may then be easily depressed to move the lock releasing bar 33 downwardly into engagement with the bracket 58 resulting in the movement of the locking roller 52 out of frictional or clutching engagement with the wear plate 54. During the period that the button 84 is maintained in depressed position, the bar 20 may be readily moved to its initial or retracted position to effect a release of the brakes. I have found that the button 84 may not be readily depressed and the brakes released without first exerting a longitudinal force in a righthand direction, and this condition is a distinct advantage when the arrangement is utilized to actuate the parking brakes as it provides an effective means to prevent inadvertent release of the brakes by children. This is a distinct advantage as a safety measure to prevent the release of the parking brakes especially if the vehicle is positioned on a hill or inclined surface.

Figures 12 and 13 illustrate a modified mounting and actuating means for the lock releasing bar 98. The brake actuating bar 20' is disposed within a housing 18' the upper surface of the bar 20' being provided with a hardened wear plate or element 54'. A locking roller 52' associated with a bracket 58' is effective to retain the bar 20' in longitudinally adjusted position as in the other form of the invention hereinbefore described. As illustrated in detail in Figure 13 a pair of longitudinally spaced pins 100 (one of which is shown in Figure 13) extend across the interior cavity of the pull bar 20'. Pivotally supported upon the pins 100 are links 101, the opposite ends of the links being pivotally connected to the lock releasing bar 98 by means of pins or rivets 103. A rod 104 is associated with a handle 44' the rod extending a short distance into the interior of the pull bar 20'. The inner end of the rod 104 is bent downwardly to form a depending projection 105 which is slotted to accommodate the end portion of the bar 98. A pin 107 is carried by the end of the bar 98 and extends into vertical slots 108 formed in the furcations of the portion 105 of the rod. The rod 104 is provided at its outer end with a cylindrical member or push button 84', a spring 87' being interposed between the cylindrical member 84' and an end wall formed on the pull bar or member 20'. The spring 87' serves to bias the rod 104 and the clutch releasing bar 98 away from releasing position. When the operator desires to "set" the brakes of the vehicle or to actuate other mechanism with which the arrangement of my invention may be used, the operator grasps the handle 44' and withdraws the bar 20' in a righthand direction as viewed in Figure 12 until the brakes are "set" or other mechanism moved to a selected position. The lock member 52', under the influence of the spring 64', acts through the bracket 58' to cause the lock or roller 52' to frictionally engage the abutment 50' and the hardened plate 54' to hold the pull bar in adjusted position. When it is desired to release the brakes or to cause retrograde movement of the pull bar 20', the operator grasps the handle 44' and exerts force in a righthand direction as viewed in Figure 12 to cause slight additional advance movement of the pull bar 20' toward brake "set" position. Concomitantly with this action the operator depresses the push button 84' moving rod 104 in a lefthand direction, the pin 107, cooperating with the walls of the slot 108, causes a pivotal movement of the lock releasing bar 98 about the axes of pins 106 whereby the bar 98 engages the bight portion of bracket 58' swinging the latter in a counterclockwise direction thus effecting a release of the lock roller 52' from frictional or locking engagement with the hardened plate 54'. The operator then exerts a forward pressure upon the handle 44' while keeping the push button 84' depressed and moves the bar 20' toward its initial position in a lefthand direction as viewed in Figures 12. It will be obvious that should the operator release pressure upon the push button 84', the release bar 98 will be swung upwardly under the influence of the spring 87' and the roller 52' will be instantly and automatically returned to clutching or braking engagement with the plate 54', such action restraining further retrograde movement of the pull bar or member 20'.

It has been found that the locking roller in both forms of the invention becomes very tightly wedged in pull bar retaining position and that it requires a slight additional movement of the pull bar toward brake setting position in order to satisfactorily effect a release of the roller through manipulation of the push button. The advantages of this arrangement have been hereinbefore pointed out in connection with the other form of the invention previously described herein.

The provision of the hardened plate on the pull bar serving as a clutch or locking surface in the several forms of the invention has several advantages. I have found that hardened and tempered steel band material suitable for this purpose may be cut to suitable lengths and the severed lengths spot welded to the pull bars. As such material may be purchased already hardened, the use of this material eliminates the hardening or heat treatment which would normally be necessary in a pull bar construction wherein a surface of the pull bar is utilized per se as a locking surface. As the pull bar is fashioned or formed from soft sheet metal, inherent stresses are set up during the metal bending operations and when the formed bar is hardened by heat treatment inherent stresses very often cause distortion of the bar. Such a situation requires normalizing and grinding operations in order to secure an accurate and satisfactory clutching surface. The use of a thin hardened band or plate on the pull bar eliminates these difficulties and effects considerable savings in manufacturing costs and provides a better wearing surface.

The provision of a lock release bar or element arranged for movement in parallelism with the longitudinal axis of the pull bar provides a simple yet effective means for releasing the friction lock or roller in any position of adjustment of the pull bar.

It is apparent that, within the scope of the invention, modifications and different arrangements may be made other than is herein disclosed, and the present disclosure is illustrative merely, the invention comprehending all variations thereof.

What I claim is:

1. A mechanism control device including in combination, a support; a member mounted on said support and arranged for longitudinal slidable movement with respect thereto; a bracket articulately supported for movement relative to said support; locking means associated with said bracket and arranged to frictionally retain said member in longitudinally adjusted position; an element carried by said member and arranged for lateral movement relative thereto for engaging the bracket to effect a release of the locking means.

2. A mechanism control device including in combination, a tubular housing; a tubular member supported in said housing and arranged for longitudinal slidable movement with respect thereto; a bracket articulately supported for movement relative to said housing; a locking roller associated with said bracket and arranged to frictionally retain said tubular member in longitudinally adjusted positions; an element carried by said tubular member and arranged for lateral movement relative thereto for engaging the bracket to effect a release of the roller.

3. A mechanism control device including in combination, a support; a member formed of sheet metal mounted upon said support and arranged for longitudinal slidable movement with respect thereto; said member having a uniplanar lock engaging surface; a bracket articulately supported for movement relative to said support; locking means including a cylindrical member associated with said bracket and arranged to engage the uniplanar surface for frictionally retaining said member in longitudinally adjusted positions; and a bar carried by said tubular member and arranged for lateral movement relative thereto for engaging the bracket to effect a release of the locking means.

4. A mechanism control device including in combination, a housing; a member supported by said housing and arranged for longitudinal slidable movement with respect thereto; a bracket pivotally supported adjacent said member; locking means associated with said bracket for retaining said member in longitudinally adjusted positions; a plate carried by said member and arranged to be engaged by said locking means; and lock releasing means including a bar coextensively disposed adjacent the member and arranged for independent lateral movement relative thereto for engagement with said bracket for releasing said locking means.

5. A mechanism control device including in combination, a tubular support; an elongated member mounted on said support and arranged for longitudinal slidable movement with respect thereto; a bracket pivotally supported adjacent said member; locking means including a roller associated with said bracket for retaining said member in longitudinally adjusted positions; a thin hardened plate welded to said member and arranged to be engaged by said roller; means including a bar coextensively disposed adjacent the member and arranged for transverse movement relative thereto for engagement with said bracket for releasing said locking means, and manually operated means for actuating said bar.

6. A mechanism control device including in combination, a support; a member mounted thereon and arranged for longitudinal slidable movement with respect thereto; a bracket pivotally supported adjacent said member; locking means associated with said bracket for retaining said member in longitudinally adjusted positions; resilient means for normally urging said locking means toward locking position; and means including a bar arranged in substantial parallelism with said member and laterally movable with respect thereto for engagement with said bracket for releasing said locking means.

7. A mechanism control device including in combination, a support; a member mounted thereon and arranged for longitudinal slidable movement with respect thereto; a bracket pivotally supported adjacent said member; locking means associated with said bracket for retaining the member in longitudinally adjusted positions; resilient means engageable with said bracket for normally urging said locking means toward locking position; lock releasing means including a bar associated with said member and laterally movable with respect thereto for engagement with said bracket, and resilient means for normally biasing said bar out of operative engagement with said bracket.

8. A control device for vehicle parking brakes including in combination, a support; a member mounted thereon and arranged for longitudinal slidable movement with respect thereto; a bracket pivotally supported adjacent said member; a locking roller associated with said bracket; a plate coextensively disposed on said member and secured thereto; resilient means engageable with said bracket for normally urging said locking roller into engagement with the plate on said member; lock releasing means including a bar associated with said member and relatively movable with respect thereto for moving with said bracket; manually operated means for moving said bar into engagement with the bracket to release the locking means, and resilient means for normally biasing said bar out of engagement with said bracket.

9. A mechanism control device including in combination, a support; a member mounted thereon and arranged for longitudinal slidable movement with respect thereto; a bracket mounted adjacent said member and arranged for movement relative to said support; a hardened metal plate carried by said member; a locking member associated with the support and engageable with the plate for retaining the member in longitudinally adjusted positions; a bar coextensively disposed adjacent said member and arranged for independent movement in an angular direction with respect to the longitudinal axis of said member for engaging and actuating said bracket toward lock releasing position, and spring means for normally biasing said bar to a position out of engagement with the bracket.

10. A control device for vehicle parking brakes including in combination, a tubular support; a member formed of sheet metal mounted thereon and arranged for longitudinal slidable movement with respect thereto; a bracket mounted adjacent said member and arranged for movement relative to said support; a hardened metal lock engaging plate secured to said member; a locking member associated with the support and engageable with the plate for retaining the member in longitudinally adjusted positions; a bar coextensively disposed adjacent said member and arranged for independent movement in a lateral direction with respect to the longitudinal axis of said member for actuating said bracket toward lock releasing position, and means for normally biasing said bar to a position out of engagement with the bracket.

11. A control device for vehicle parking brakes including in combination, a support; a hollow member formed of sheet metal mounted thereon and arranged for longitudinal slidable movement with respect thereto; a bracket mounted adjacent said member and arranged for relative pivotal movement; a thin metal plate welded to said member; a locking member associated with the support and engageable with the plate for retaining the member in longitudinally adjusted positions; a bar coextensively disposed within the hollow interior of said member and arranged for independent movement in an angular direction with respect to the longitudinal axis of said member for engaging and actuating said bracket toward lock releasing position, and means for normally biasing said bar to a position out of engagement with the bracket.

12. A mechanism control device including in combination, a support; a member formed of sheet metal carried thereby and arranged for longitudinal slidable movement with respect thereto; a bracket pivotally mounted upon said support; a locking member associated with said bracket for retaining said member in longitudinally adjusted positions; means for normally biasing said locking member toward locking position; lock releasing means including a bar disposed adjacent said member, and means for supporting said bar including a pin and slot connection whereby said bar is relatively movable transversely of said member for engagement with said bracket to effect a release of the locking member.

13. A mechanism control device including in combination, a support; a member carried thereby and arranged for longitudinal slidable movement with respect thereto; a bracket articulately mounted upon said support; a locking member associated with said bracket for retaining said member in longitudinally adjusted positions; means for normally biasing said locking member toward locking positions; lock releasing means including a bar disposed adjacent said member; means for supporting said bar including a pin and slot connection whereby said bar is relatively movable transversely of but in parallelism with the member for engagement with said bracket to effect a release of the locking member; means for normally biasing said bar to a position out of engagement with the bracket, and manually operable means for actuating said bar toward lock releasing position.

14. A mechanism control device including in combination, a support; a member formed of sheet metal carried thereby and arranged for longitudinal slidable movement with respect thereto; a bracket articulately mounted upon said support; a locking member associated with said bracket for retaining said member in longitudinally adjusted positions; means for normally biasing said locking member toward locking position; locking member releasing means including a bar disposed adjacent said member; and means for supporting said bar including a pair of links whereby said bar is relatively movable transversely of but in parallelism with the member for engagement with said bracket to effect a release of the locking member.

15. A mechanism control device including in combination, a support; a member formed of sheet metal carried thereby and arranged for longitudinal slidable movement with respect thereto; a bracket pivotally mounted upon said support; a locking roller associated with said bracket for retaining said member in longitudinally adjusted positions; means for normally biasing said locking roller toward clutching position; lock releasing means including a bar disposed adjacent said member; means for supporting said bar including a pin and slot connection whereby said bar is relatively movable transversely of but in substantial parallelism with the member for engagement with said bracket to effect a release of the locking member; resilient means for normally biasing said bar to a position out of engagement with the bracket, and manually operable means for actuating said bar toward lock releasing position.

ROBERT S. HINSEY.

References Cited in the file of this patent

UNITED STATES PATENTS

| Number | Name | Date |
|---|---|---|
| 2,141,266 | Dickerson | Dec. 27, 1938 |
| 2,169,888 | Snell | Aug. 15, 1939 |
| 2,205,987 | McCarthy | June 25, 1940 |
| 2,303,586 | Snell | Dec. 1, 1942 |
| 2,427,103 | Hettinga | Sept. 9, 1947 |
| 2,443,697 | Smith | June 22, 1948 |
| 2,558,558 | Hinsey | June 26, 1951 |